United States Patent

Sato et al.

[11] Patent Number: 5,943,514
[45] Date of Patent: Aug. 24, 1999

[54] FOCUSING SYSTEM

[75] Inventors: Osamu Sato; Masahiro Kawasaki; Yasushi Tabata, all of Tokyo, Japan

[73] Assignee: Asahi Kogaku Kogyo Kabushiki Kaisha, Tokyo, Japan

[21] Appl. No.: 08/897,149

[22] Filed: Jul. 18, 1997

[30] Foreign Application Priority Data

Jul. 19, 1996 [JP] Japan .................................. 8-190512
Jul. 19, 1996 [JP] Japan .................................. 8-190513
Jul. 19, 1996 [JP] Japan .................................. 8-190514

[51] Int. Cl.[6] .................................................. G03B 13/36
[52] U.S. Cl. .............................. 396/96; 396/128; 396/123
[58] Field of Search ............................. 396/92, 96, 104, 396/123, 125, 89, 111, 121, 100, 128

[56] References Cited

U.S. PATENT DOCUMENTS

| | | |
|---|---|---|
| 4,743,931 | 5/1988 | Matsuzaki et al. . |
| 4,792,822 | 12/1988 | Akiyama et al. . |
| 4,992,817 | 2/1991 | Aoyama et al. . |
| 5,084,722 | 1/1992 | Taniguchi et al. ................. 396/92 |
| 5,121,154 | 6/1992 | Yamada et al. ................. 396/104 |
| 5,146,261 | 9/1992 | Soshi . |
| 5,262,820 | 11/1993 | Tamai et al. . |
| 5,302,997 | 4/1994 | Cocca ................................. 396/111 |
| 5,319,412 | 6/1994 | Hamada et al. . |
| 5,517,273 | 5/1996 | Tsukada . |
| 5,530,236 | 6/1996 | Sensui . |
| 5,597,999 | 1/1997 | Kimba et al. . |
| 5,646,393 | 7/1997 | Sensui . |
| 5,784,654 | 7/1998 | Saito et al. ....................... 396/104 |

FOREIGN PATENT DOCUMENTS

| | | |
|---|---|---|
| 0298725 | 1/1989 | European Pat. Off. . |
| 0444952 | 9/1991 | European Pat. Off. . |
| 0556598 | 8/1993 | European Pat. Off. . |
| 7-49227 | 2/1995 | Japan . |
| 7-72380 | 3/1995 | Japan . |
| 7-92376 | 4/1995 | Japan . |
| 2033593 | 5/1980 | United Kingdom . |
| 1575181 | 9/1980 | United Kingdom . |
| 2093655 | 9/1982 | United Kingdom . |
| 2139368 | 11/1984 | United Kingdom . |

Primary Examiner—W. B. Perkey
Attorney, Agent, or Firm—Greenblum & Bernstein, P.L.C.

[57] ABSTRACT

A focusing system receives object light by a light receiving device having an array of light receiving elements. An amount of defocus or an object distance can be detected in accordance with the output of the light receiving device. The light receiver includes at least three spaced light receivers. A controller controls the quantity of light received by each of the light receivers such that each of the light receivers is either independently controlled, or a pair of outermost light receivers are controlled simultaneously.

28 Claims, 12 Drawing Sheets

| D7 | D6 | D5 | D4 | D3 | D2 | D1 | D0 |
|---|---|---|---|---|---|---|---|
| COMMENCING INTEGRATION | TERMINATING THE INTEGRATION | SELECT A | SELECT B | SELECT C | .1 | 1 | LS / SLR |

| LS/SLR REGISTER | SELECT LINE SENSOR |
|---|---|
| LS (0) | 13A, 13C |
| SLR (1) | 13A |
| | 13B |
| | 13C |

FIG. 8

| LS/SLR REGISTER | SELECT LINE SENSOR | MONITOR SENSOR |
|---|---|---|
| LS (0) | 13A, 13C | M1~M10 |
| SLR (1) | 13A | M1~M3 |
| | 13B | M11~M15 |
| | 13C | M16~M18 |

FIG. 10

| LS/SLR REGISTER | SELECT LINE SENSOR | MONITOR SENSOR MONITOR DARK SENSOR | INTEGRAL CONTROL CIRCUIT |
|---|---|---|---|
| LS (0) | 13A, 13C | M1~M10 MD1 | 25A, 25B |
| SLR (1) | 13A | M1~M3 MDI | 25A |
|  | 13B | M11~M15 MDI | 25B |
|  | 13C | M16~M18 MD2 | 25C |

FOCUSING SYSTEM

BACKGROUND OF THE INVENTION

1. Field of the Invention

The present invention relates to a focusing system which can be incorporated in a single lens reflex camera, a lens shutter type camera, or a compact camera.

2. Description of the Related Art

In a passive autofocusing system for a single lens reflex camera, object light incident upon a photographing lens is condensed by a condenser lens and is split by a separator lens, so that the split beams are converged onto a pair of receiving areas on an array of light receiving elements to form object images. Thereafter, the distance between the object images formed on each receiving area is detected in accordance with the integral values output from the light receiving element array. An amount of defocus (defocus amount) is obtained in accordance with the distance between the object images. The autofocusing system moves a focusing lens group of the photographing lens, so that the defocus amount is zero, i.e., the distance between the object images formed on each light receiving area is zero.

In a passive autofocusing system for a lens shutter type camera or a compact camera, an object image is formed onto a pair of light receiving element arrays by a pair of imaging lenses through a photographing lens. The distance between the object images formed on each receiving element array is detected in accordance with integration values of the output from the light receiving element arrays. Consequently, the object distance is measured by triangulation, based on the base length of a pair of imaging lenses and the f-number of the imaging lenses. The autofocusing system moves a focusing lens group of the photographing lens in accordance with the object distance. A CCD line sensor or a MOS line sensor can be used as the light receiving element array.

In particular, in an autofocusing system in a lens shutter type camera, the object distance is measured by a triangulation. Hence, as the base length, i.e., the distance between the imaging lenses increases, the measurement precision becomes high. Moreover, in general, since the imaging lens has a fixed focus, the object image formed on the light receiving element array is dimmed depending on the object distance. The dimmed image deteriorates the precision in the measurement of the position of the object image. To reduce a measurement error, it is preferable that the distance between a pair of light receiving element arrays be increased.

In a single lens reflex camera, the position adjustment of the focusing lens is accomplished by repeatedly effecting the integrating operations of the CCD line sensor to minimize the defocus amount. Therefore, it is possible to obtain a high measurement precision without increasing the distance between the object images in comparison with the lens shutter type camera. Furthermore, in a single lens reflex camera, since an AF unit including a condenser lens, a separator lens, a CCD line sensor, etc., is housed in a lower portion of a mirror box, not only must the AF system be miniaturized, but also the size and pitch of the light receiving elements of the CCD must be reduced.

In an autofocusing system using a CCD line sensor, the integration time of the light receiving elements is controlled in accordance with an output of a monitor provided adjacent to the light receiving element array to prevent the electric charges integrated, i.e., accumulated, in the light receiving elements which have received the object light from overflowing. To detect the defocus amount, a pair of object images are formed on one light receiving element array and the distance between the object images is detected. Therefore, it is necessary for a monitor sensor to monitor only half the light receiving area of the light receiving element array. However, in the case of the lens shutter type camera in which the distance between the object images formed on each of the spaced light receiving element arrays is measured to detect the object distance, the monitor sensor must monitor the substantially entire light receiving area of at least one of the light receiving element arrays.

Therefore, in the prior art, different autofocusing systems having different optical systems and light receiving element arrays must be prepared for the single lens reflex camera and the lens shutter type camera.

SUMMARY OF THE INVENTION

It is an object of the present invention to provide a passive focusing system which can be used commonly to a single lens reflex camera and a lens shutter type camera.

The inventors have concentrated on a multiple focus detection system in a single lens reflex camera, in which a plurality of spaced zones are measured. An optical system for such a multiple focus detection system is disclosed, for example, in Japanese Unexamined Patent Publication No. 7-72380. In this optical system, the light receiving element arrays can be aligned along a line.

To achieve the object mentioned above, according to the present invention, there is provided a focusing system in which a light receiving device has a pair of light receiving element arrays which each receive object light. A determining mechanism determines whether outputs of the pair of light receiving element arrays are to be used for the detection of a defocus amount or the detection of an object distance.

Provision is made for a focusing system in which object light is received by a plurality of light receiving devices, each having an array of light receiving elements so that a defocus amount or an object distance can be detected in accordance with the output of the light receiving devices.

The light receiving devices comprise a central light receiving device and a pair of outer light receiving devices which are located on opposite sides of the central light receiving device and which are spaced from one another at a predetermined distance. A control mechanism controls the quantity of light received by each of the light receiving devices.

Additionally, a determining mechanism which determines whether the outputs of the central and the pair of outer light receiving devices, or only the pair of outer light receiving devices, are to be used for the detection of the defocus amount or the object distance upon assembly of the focusing system to a camera.

The light receiving devices are controlled such that each of the light receiving devices is controlled independently by the control mechanism when the determination is to be used for the detection of the defocus amount. Alternatively, the pair of both outer light receiving devices are controlled simultaneously by the control mechanism when the determination is to be used for the object distance.

With this arrangement, it is possible to detect focuses for a plurality of spaced objects in a single lens reflex camera, and it is possible to increase the precision of measurement by the use of a pair of outer light receiving devices in a lens shutter type camera.

When the automatic focusing system is applied to a single lens reflex camera, provision can be made of an optical focus detecting device to form a pair of spaced object images on at least one of the light receiving element arrays of the three light receiving devices through a photographing system, so that an amount of the defocus can be detected in accordance with the output signals of the light receiving element arrays on the object images formed by the focus detecting device.

When the automatic focusing system is applied to a lens shutter type camera, an optical focus detecting device having a pair of imaging lenses can be provided. This forms an object image on each of the light receiving element arrays of the outer light receiving devices so that the object distance can be detected in accordance with the output signals of the light receiving element arrays on the object images formed by the focus detecting device.

As can be seen from the foregoing, the automatic focusing system can be applied commonly to both the single lens reflex camera and the lens shutter type camera only by changing the focus detecting device.

According to a second aspect of the present invention, there is provided an automatic focusing system in which object light is received and integrated by a plurality of light receiving devices, each having an array of light receiving elements. In this arrangement a defocus amount or an object distance can be detected in accordance with the integrated value of the light receiving devices.

There is provided a monitoring mechanism adjacent to each of the light receiving devices for monitoring the quantity of light received by the corresponding light receiving device. For each of the monitor mechanisms, there is provided an integration control mechanism which controls integration of each of the light receiving devices in accordance with the outputs of the monitor means. At least one of the pair of monitor mechanism for the pair of outer light receiving devices is capable of monitoring a substantially entire light receiving area of the associated light receiving device.

The integration control mechanism are adapted to control the central and the pair of outer light receiving devices independently, or to control the pair of outer light receiving devices simultaneously, in accordance with a determination of the determining mechanism.

The integration control means controls the monitor mechanism to monitor the substantially entire light receiving area of the associated light receiving device when the pair of side light receiving devices are controlled simultaneously.

With this arrangement, since an appropriate quantity of light or integral time for each light receiving device can be obtained, the focus can be precisely measured in a wide range of the object brightness, regardless of the kind of the camera, i.e., the single lens reflex camera or the lens shutter type camera.

When the second aspect of the invention is applied to a single lens reflex camera, provision is made for an optical focus detecting device to form a pair of spaced object images on at least one of the light receiving elements. When the defocus amount is detected in accordance with the integral outputs of the light receiving devices on the object images formed by the focus detecting device, the integration control mechanism controls the quantity of light to be received by the light receiving device, using the portion monitor mechanism adjacent to the light receiving device on which one of the object images is formed.

When the second aspect of the invention is applied to a lens shutter type camera, provision is made for an optical focus detecting device having a pair of imaging lenses to form an object image on each of the pair of outer light receiving devices. When the object distance is detected in accordance with the integral outputs of the light receiving device on the object images formed by the focus detecting device, the integration control mechanism controls the integration of the pair of light receiving devices. The entire light receiving area of the monitor mechanism whose width is large enough to monitor the substantially entire light receiving area of one of the pair of light receiving devices is used.

As may be understood from the foregoing, with this structure, the automatic focusing system can be commonly used for a single lens reflex camera and a lens shutter type camera. Moreover, an appropriate integral time can be obtained by switching the light receiving sections of the monitor mechanism to be used, thus resulting in a highly precise measurement.

According to a third aspect of the present invention, there is provided an automatic focusing system in which object light is received and integrated by a plurality of light receiving devices, each having an array of light receiving elements, so that a defocus amount or an object distance can be detected in accordance with integral value of the light receiving devices. The light receiving devices have one central light receiving device and a pair of outer light receiving devices which are located on opposite sides of the central light receiving device and which are spaced from one another at a predetermined distance. Monitor mechanism which are provided for, and adjacent to, each of the light receiving devices for monitoring the quantity of light received by the corresponding light receiving device. Integration control mechanism are provided for each of the light receiving devices to control integration time for the light receiving devices in accordance with outputs of the monitor mechanisms. A determining mechanism determines whether outputs of the central and the pair of outer light receiving devices, or only the pair of outer light receiving devices are to be used for the detection of the defocus amount or the object distance upon assembly of the focusing system to a camera.

In this arrangement, all the integration control mechanisms are used when the outputs of both the central and the pair of outer light receiving devices are to be used for the detection of the defocus amount or the object distance in accordance with the determining mechanism.

The integration control mechanism for the central light receiving device and for one of the outer light receiving devices are used when only the pair of outer light receiving devices are to be used for the detection of the defocus amount or the object distance in accordance with the determining mechanism.

With this arrangement, since an appropriate quantity of light can be obtained for each light receiving element array, the focus can be precisely measured in a wide range of the object brightness, regardless of the kind of camera, i.e., the single lens reflex camera or the lens shutter type camera. For a lens shutter type camera, the precision of the measurement can be enhanced.

When the third aspect of the invention is applied to a single lens reflex camera, an optical focus detecting device is provided to form a pair of spaced object images on at least one of the light receiving devices through a photographing system. When the defocus is detected in accordance with the integral outputs of the light receiving device on the object images formed by the focus detecting device, the integration control mechanism controls the quantity of light to be received by the light receiving device. The portion of the monitor means corresponding to the light receiving area of the light receiving device on which one of the object images is formed is used.

When the third aspect of the invention is applied to a lens shutter type camera, provision is made of an optical focus detecting device having a pair of imaging lenses to form an object image on each of the pair of outer light receiving devices. When the object distance is detected in accordance with the integral outputs of the light receiving devices on the object images formed by the focus detecting device, the integration control mechanism controls the integration of the pair of light receiving devices. A portion of the monitor means whose width is large enough to monitor the substantially entire light receiving area of one of the pair of light receiving devices is used.

With this structure, the automatic focusing system can be commonly applied to a single lens reflex camera and a lens shutter type camera. Also, the integration control means can be commonly used. The present disclosure relates to subject matter contained in Japanese Patent Application Nos. 08-190512, 08-190513, and 08-190514 (all filed on Jul. 19, 1996) which are expressly incorporated herein by reference in their entireties.

BRIEF DESCRIPTION OF THE DRAWINGS

The invention will be described below in detail with reference to the accompanying drawings, in which:

FIG. 5 is a conceptual view of data which is transmitted through a serial communication and which is latched in a register of an AF sensor;

FIG. 6 is a diagram showing the relationship between the content of data and a sensor to be used in a first embodiment;

FIG. 8 is a diagram showing the relationship between the content of data and a sensor to be used in a second embodiment;

FIG. 10 is a diagram showing the relationship between the content of data and a sensor to be used in a third embodiment;

DESCRIPTION OF THE PREFERRED EMBODIMENT

Figure 1:
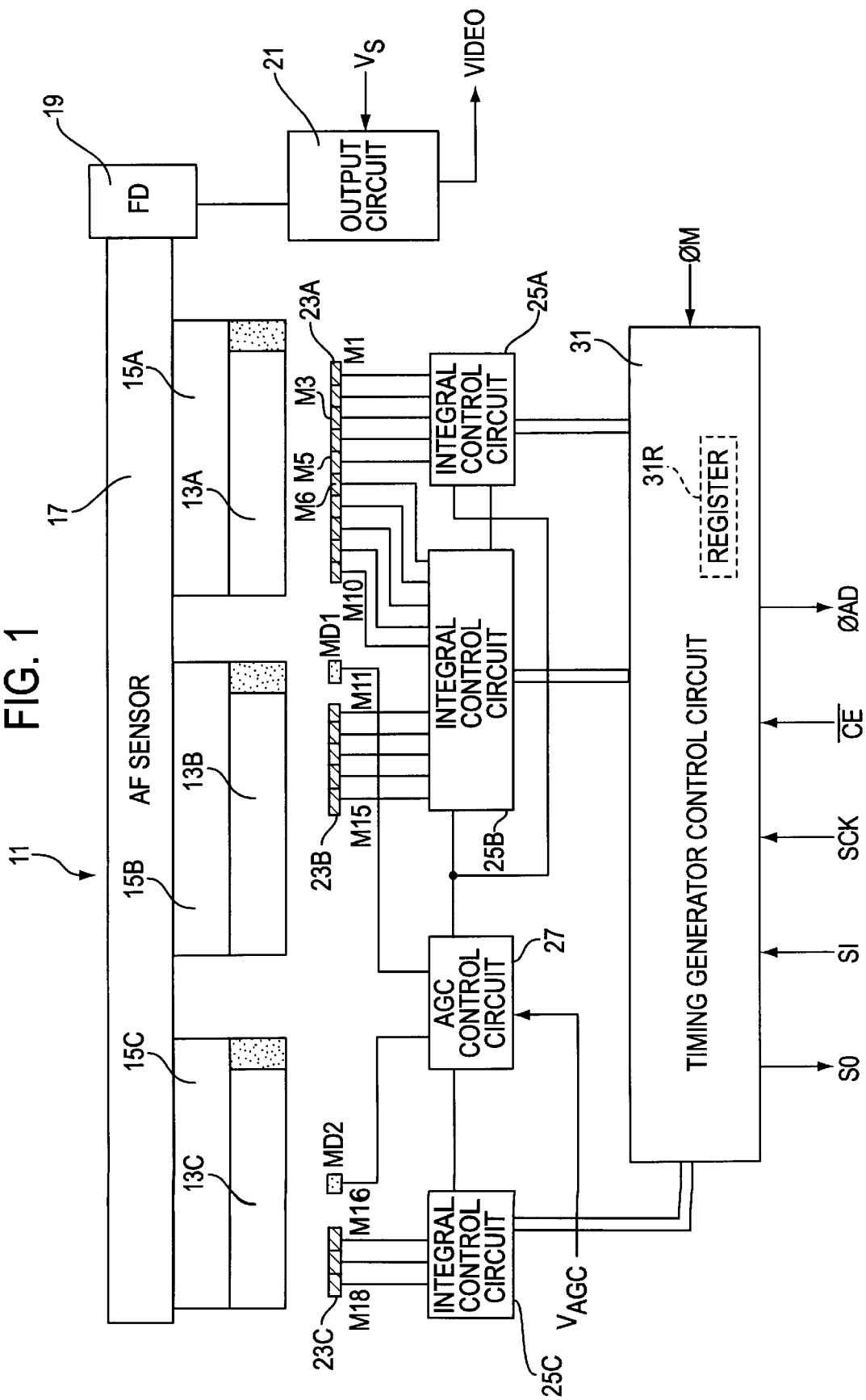
FIG. 1 is a block diagram of the main components of an AF unit which is an embodiment of a focusing system according to the present invention.
Figure 2:
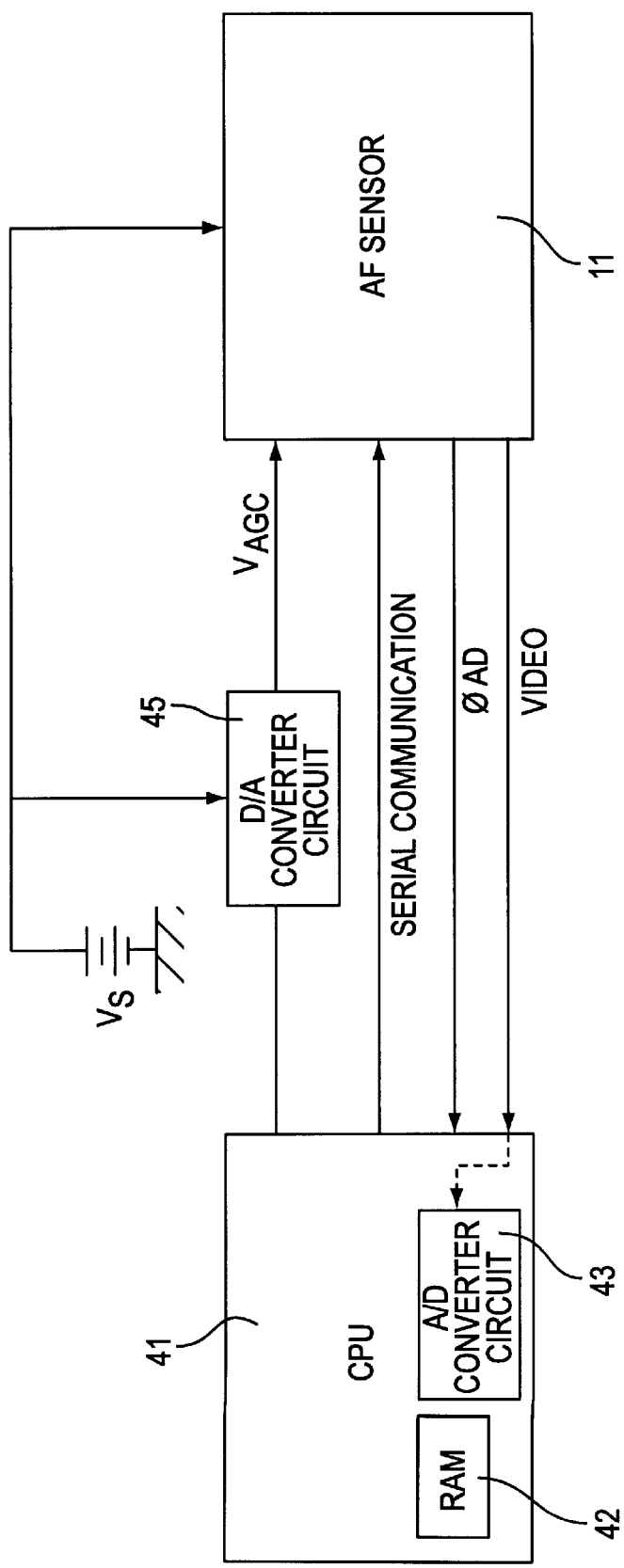
FIG. 2 is a block diagram of a control circuit of a control system of a camera in which an AF unit is incorporated, according to the present invention.
Figure 3:
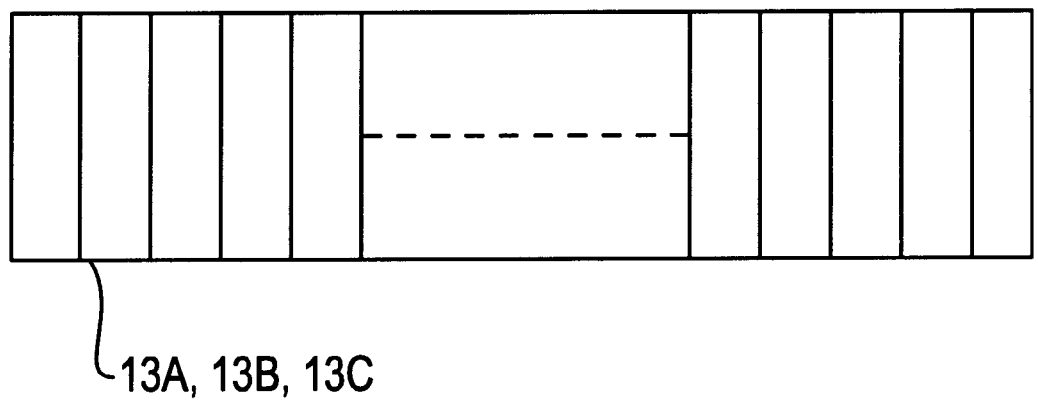
FIG. 3 is an embodiment of a line sensor in an AF unit shown in FIG. 1.

FIG. 1 shows a passive focusing system (AF sensor 11) to which the present invention is applied; FIG. 2 shows a block diagram of a main circuit when the AF sensor 11 is applied to a camera; and, FIG. 3 shows another embodiment of a line sensor used in the AF sensor.

The AF sensor 11 includes of three spaced line sensors 13A, 13B, 13C which are aligned along a line, memory portions 15A, 15B, 15C provided adjacent to the line sensors 13A, 13B, 13C, and one transferring CCD shift register 17 adjacent to the memory portions 15A, 15B, 15C. The line sensors 13A, 13B, 13C are made of photo diode arrays which are each provided with photo diodes (pixels). The diodes spaced from one another at a predetermined distance and aligned along a line to receive object light and convert the received light into an electric signal. The line sensors 13A, 13B and 13C are provided with charge accumulation portions in which the electric charges produced in the photo diodes are integrated (accumulated).

The electric charges accumulated in the line sensors 13A, 13B and 13C (charge accumulation portions) are transferred to the corresponding memory portions 15A, 15B and 15C. The memory portions 15A, 15B and 15C temporarily store the charges transferred for each line sensor. The pixel signals transferred to the memory portions 15A, 15B and 15C are transferred at one time to the CCD shift register 17. The image signals are thereafter serially transferred through the CCD register 17, converted to a voltage by an output converting portion, (FD) 19, and amplified by an output circuit 21. Thus, a video signal as an integrated signal for each pixel is output.

Figure 7A:
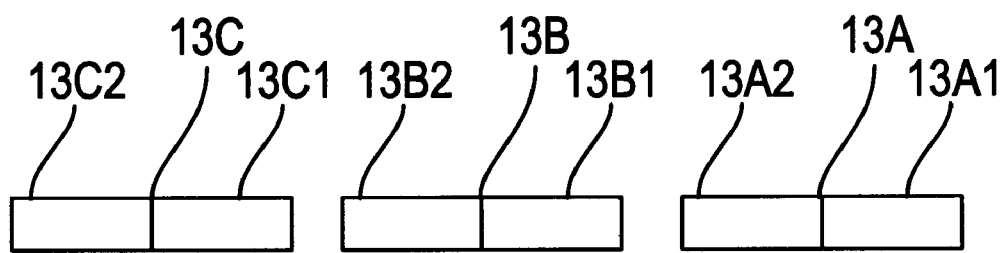
FIGS. 7A and 7B are schematic views of a light receiving element array of an AF sensor for a single lens reflex camera and a lens shutter type camera, in a first embodiment, respectively.

The video signal supplied from the output circuit 21 to a CPU 41 is converted to digital pixel data by an A/D converter circuit 43 incorporated in the CPU 41, and successively stored in an internal RAM 42 of the CPU 41 at a predetermined address. The CPU 41 reads the pixel data for a predetermined area from the RAM 42 to use the image data in the calculation to obtain the object distance. For instance, in the case of a single lens reflex camera, a group of pixel data is divided into pixel data groups for pairs of areas 13A1, 13A2; 13B1, 13B2; 13C1 and 13C2 (FIG. 7A). One of the areas in each pair is a standard area and the other area is a reference area. The distance between the object images formed in the standard area and the reference area is detected in accordance with the pixel data group contained in each area to thereby detect the defocus amount in accordance with the distance between the object image.

Figure 7B:
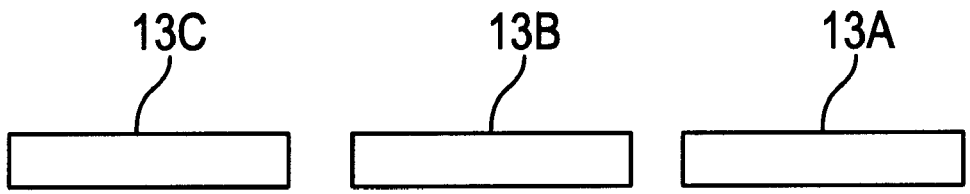

In the case of a lens shutter type camera, the center line sensor 13B is not used and the outermost line sensors (end line sensors) 13A and 13C are used, that is, the pixel data groups of the respective line sensors 13A, 13C are used (FIG. 7B). Namely, the positions of the object images formed in the line sensors 13A and 13C and the distance between the object images are detected in accordance with the pixel data of the line sensors 13A and 13C to thereby detect the object distance using triangulation.

Although the line sensors shown in FIG. 1 are spaced from one another, it is possible to use consecutive line sensors as shown in FIG. 3, in the present invention.

Embodiments of the present invention will be discussed below in more detail.

Monitor sensors 23A, 23B and 23C adjacent to the corresponding line sensors 13A, 13B and 13C control the integration time (end of the integration) thereof. The monitor sensors 23A, 23B and 23C receive the light in close proximity of the object image received by the line sensors 13A, 13B and 13C. The monitor sensors 23A, 23B and 23C are each provided with a plurality of light receiving elements. Monitor dark sensors MD1 and MD2 are aligned with monitor sensors 23B and 23C to correct dark current components of the monitor sensors 23A, 23B and 23C.

The width of the monitor sensor 23A is large enough to monitor the entire light receiving area of the line sensor 13A. The monitor sensor 23A is split into ten monitor elements M1 to M10. The integral outputs of the monitor elements M1 to M5, which monitor approximately half the light receiving area of the line sensor 13A, are sent to an integral control circuit (integration control circuit) 25A. The monitor sensor 23A is split into ten monitor elements M1 to M10. The integral outputs of the monitor elements M6 to M10 which monitor the remainder (half) of the light receiving area of the line sensor 13A, are sent to an integral control circuit (integration control circuit) 25B.

The width of the monitor sensor 23B is large enough to monitor about half the light receiving area of the line sensor 13B. The monitor sensor 23B is split into five monitor elements M11 to M15. The outputs of the monitor elements M11 to M15 which monitor around half the light receiving area of the line sensor 13B, are supplied to the integration control circuit 25B.

The width of the monitor sensor 23C is large enough to monitor a part of the left portion (FIG. 1) of the light receiving area of the line sensor 13C. The monitor sensor 23C is split into three monitor elements M16 to M18. The outputs of the monitor elements M16 to M18 are supplied to an integral control circuit (integration control circuit) 25C.

The outputs of the monitor dark sensors MD1 and MD2 are supplied to an AGC control circuit 27.

The reference analogue voltage VAGC, output from the CPU 41 and converted by the D/A converter circuit 45, is supplied to the AGC control circuit 27. The reference voltage VAGC is used to restrict the video signal output level. The AGC control circuit 27 corrects the reference voltage VAGC in accordance with the outputs of the monitor sensors MD1 and MD2 and supplies the same to the integration control circuit 25A, 25B, and 25C in which the corrected reference voltage is compared with the output voltages of the monitor sensors 23A, 23B and 23C. When the output voltages are identical to the corrected reference voltage, the electric charges accumulated in the corresponding line sensors 13A, 13B and 13C are transferred to the memory portions 15A, 15B and 15C. Thus, the charge accumulation (integration) of the line sensors 13A, 13B and 13C is completed. If the output voltage of the monitor sensors 23A, 23B or 23C does not reach the corrected reference voltage, the integration of the corresponding line sensors 13A, 13B or 13C is compulsively ended when a predetermined time has elapsed.

The monitor sensors 23A, 23B and 23C, the integration control circuits 25A, 25B and 25C, the AGC control circuit 27, and the CPU 41 are the main components of the integration control means.

The AF sensor 11 receives the 8 bit data from the CPU 41 through serial communication and performs the integral operation in accordance with the 8 bit data. The integral operation of the AF sensor 11 will be discussed below with reference to FIGS. 4 through 6.

Figure 4:
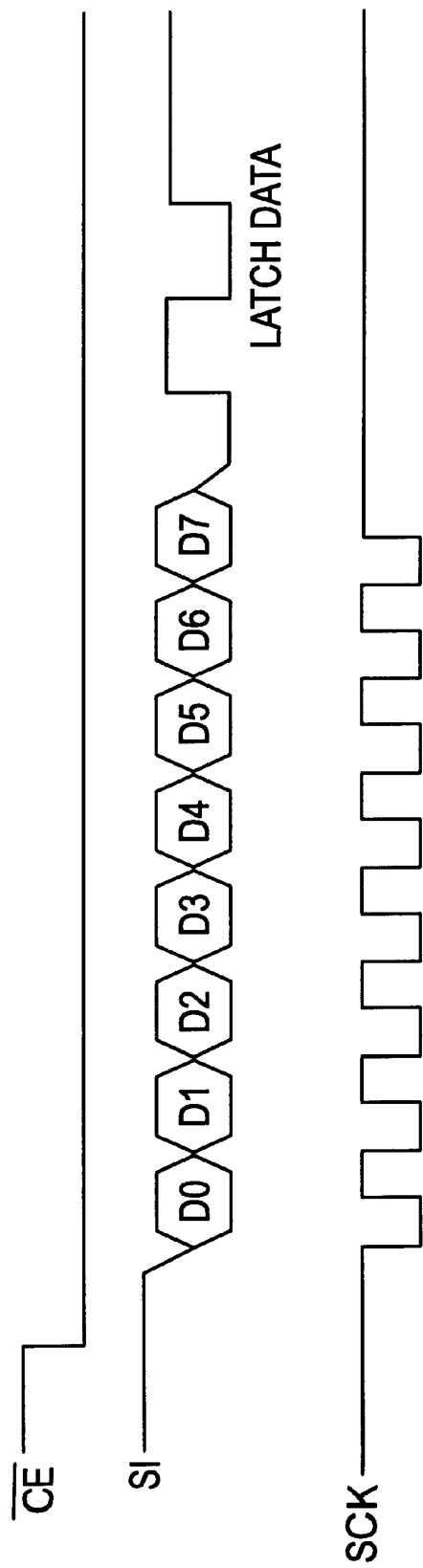
FIG. 4 is a timing chart of a serial communication between a CPU and an AF unit in a camera shown in FIG. 2.

The integrating operation of the AF sensor 1 is controlled in accordance with the content of the data (FIG. 5) received through serial communication (FIG. 4). In the illustrated embodiment, the CPU 41 sends the 8 bit data to the AF sensor 11 through the serial communication. The AF sensor 11 latches the data in the register 31R of the timing generator control circuit 31, so that the integrating operation is carried out in accordance with the content of the data.

The line sensors 13A, 13B, 13C, the memory portions 15A, 15B, 15C, the integrating operation of integral operation circuits (integration control circuits) 25A, 25B, 25C, the integrating control operation of the AGC control circuit 27, the charge transfer operation and output operation of the CCD shift register 17, the output converting portion 19 and the output circuit 21 are driven or controlled by the timing generator control circuit 31, which operates in accordance with the external clock $\phi M$. In FIGS. 1 and 4, "CE" designates the signal which activates the serial communication, "SI" the serial data input signal, "SO", the serial data output signal, "SCK" the serial communication operation clock, "$V_s$" the video output reference voltage, "$\phi M$" the external reference clock supplied from an oscillator (not shown), and "$\phi AD$" the A/D conversion timing signal which also serves as an integration completion signal, respectively.

The content of the data of the register 31R is shown in FIG. 5. The lowest bit D0 is a bit for discriminating a lens shutter camera (LS) or a single lens reflex camera (SLR) ; the bit D3 is a flag for selecting the line sensor 13C; the bit D4 is a flag for selecting the line sensor 13B; the bit D5 is a flag for selecting the line sensor 13A; the bit D6 is a flag for compulsively terminating the integration; and the bit D7 is a flag for commencing the integration.

The embodiments in which the AF sensor 11 is applied to a single lens reflex camera or to a lens shutter type camera are shown in FIGS. 6, 7A, 7B, 12 and 13.

The line sensors to be used depend on the kind of the camera, i.e, LS or SLR in a first embodiment are shown in a table of FIG. 6. The line sensors to be used for the single lens reflex camera and for the lens shutter type camera are indicated by thick solid lines in FIGS. 7A and 7B, respectively. For the single lens reflex camera (SLR), the integrating operation is carried out for all of the three line sensors 13A, 13B and 13C or those selected from among them. For the lens shutter type camera (LS), the integrating operation is carried out for a pair of outermost line sensors 13A and 13C.

Figure 12:
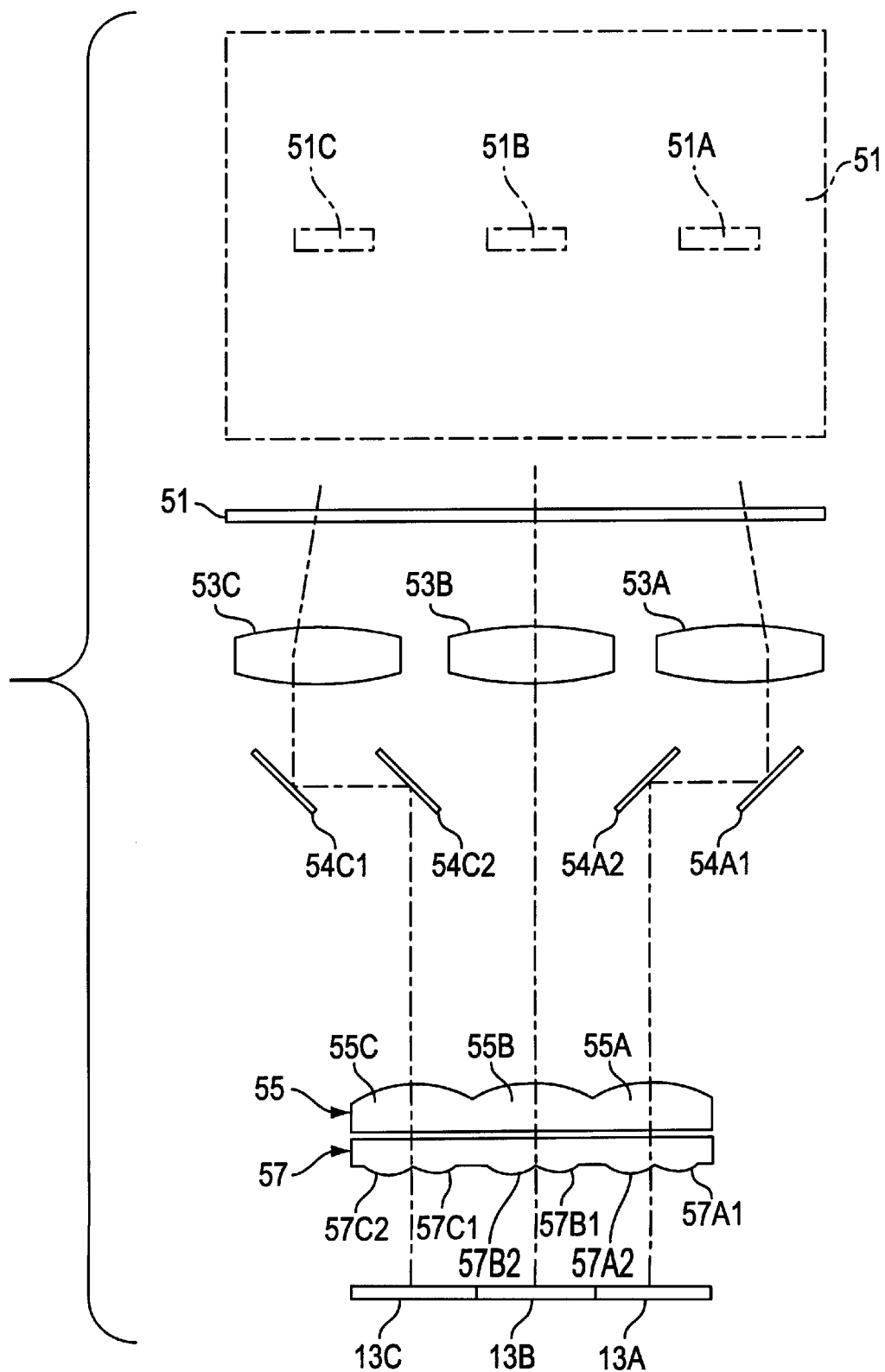
FIG. 12 is a schematic view of an optical system of an AF sensor applied to a single lens reflex camera, according to the present invention; and, FIG. 13 is a schematic view of an optical system of an AF sensor applied to a lens shutter type camera, according to the present invention.

FIG. 12 shows an optical focusing system in which the AF sensor 11 is applied to a single lens reflex camera. In a single lens reflex camera, a field mask 51 is located in a predetermined focal plane in which an object image is formed by a photographing lens. The field mask 51 is provided with openings 51A, 51B and 51C which define the object distance measuring area. In the illustrated embodiment, the openings are spaced equi-distant and have the shape of rectangular openings whose major sides extend along a line. The predetermined focal plane is equivalent to a film plane in a camera using a silver-halide film camera or a light receiving surface of an image pickup device in an electronic still camera.

There are condenser lenses 53A, 53B and 53C behind the corresponding openings 51A, 51B and 51C of the field mask 51. The condenser lenses 53A, 53B and 53C also function as relay lenses which make the object light passing through the openings 51A, 51B and 51C incident upon auxiliary lenses 55A, 55B and 55C. Mirrors 54A1, 54A2, 54C1 and 54C2 are provided between the condenser lenses 53A and 53C and the auxiliary lenses 55A and 55C to move the object light passing through the openings 51A and 51C close to the object light passing through the opening 51B, respectively.

Pairs of separator lenses 57A1, 57A2; 57B1, 57B2; 57C1 and 57C2 are provided behind the auxiliary lenses 55A, 55B and 55C, respectively. The pairs of separator lenses 57A1, 57A2; 57B1, 57B2; 57C1 and 57C2 are adapted to split the light transmitted through the openings 51A, 51B and 51C and project the split images onto different portions of the line sensors 13A, 13B and 13C that are located on a secondary image forming surface. The secondary image forming surface is a surface on which the image of the predetermined image forming surface is formed, so that the object image formed by the photographing lens is formed on the secondary image forming surface.

As mentioned above, the condenser lenses 53A and 53C are offset from the optical axis, and the object light passing through the openings 51A and 51C is moved toward the object light passing through the opening 51B by the mirrors 54A1, 54A2, 54C1 and 54C2. With this arrangement, it is possible to increase the distance between the openings 51A, 51B and 51C without changing the distance between the line sensors 13A, 13B and 13C.

When the timing generator control circuit 31 receives the signal "1" from the LS/SLR register through the serial communication, an SLR mode is established, so that the line sensors 13A, 13B and 13C can independently perform the integrating operation. Namely, the integrating operation of the line sensor 13A is controlled by the light receiving elements M1 through M3 of the monitor sensor 23A and the integrating operation control circuit 25A; the integrating operation of the line sensor 13B is controlled by the light receiving elements M11 through M15 of the monitor sensor 23B and the integrating operation control circuit 25B; and, the integrating operation of the line sensor 13C is controlled by the light receiving elements M16 through M18 of the monitor sensor 23C and the integrating operation control circuit 25C. The reason that the monitor light receiving elements M1 through M3 are used is to meet the number and position of the corresponding light receiving elements M16 through M18 of the line sensor 13C.

The line sensors 13A, 13B and 13C are selectively used in accordance with the output of the A-B-C selector of the timing generator control circuit 31 to perform the integrating operation, so that the charges of the photo diodes of the selected line sensors 13A, 13B and 13C are output to the CPU (controller) 41 as video signals. The CPU 41 calculates the distance between a pair of images for each of the line sensors 13A, 13B and 13C to thereby obtain a defocus amount.

Another embodiment in which the AF sensor 11 is applied to a lens shutter type camera will be discussed below with reference to FIG. 13.

A pair of image forming lenses 61 (61A and 61C) as an optical focus detecting system are provided in front of the left and right line sensors 13A and 13C. The beams of the object light incident upon the imaging lenses 61A and 61C are converged onto the line sensors 13A and 13C or in the vicinity thereof by the imaging lenses 61A and 61C, respectively.

When the timing generator control circuit 31 receives the signal "0" from the LS/SLR register through the serial communication, an LS mode is established, so that the line sensors 13A and 13C can simultaneously perform the integrating operation as if they were one line sensor. Namely, the outputs of the (monitoring) light receiving elements M1 through M5 of the monitor sensor 23A are input to the integrating operation control circuit 25A; the outputs of the (monitor) light receiving elements M6 through M10 are supplied to the integrating operation control circuit 25B; and, the output of the integrating operation control circuit 25B is input to the integrating operation control circuit 25A. Thus, the monitor light receiving elements M1 through M10 are controlled by the integrating operation control circuits 25A and 25B. Note that the integrating operation of the line sensor 13C is controlled not by the monitor light receiving elements M16 through M18 and the integrating operation control circuit 25C, but by the integration operation control circuits 25A and 25B together with the line sensor 13A. No integration control of the line sensor 13B is carried out.

The line sensors 13A and 13C are selectively used in accordance with the output of the A-B-C selector of the timing generator control circuit 31 to perform the integrating operation, so that the charges integrated by the photo diodes of the line sensors 13A and 13C are supplied to the CPU (control means) 41 of the camera as video signals. The CPU 41 calculates the distance between a pair of images on the line sensors 13A and 13C to thereby obtain the object distance using triangulation in accordance with the distance between the images and the focal length of the imaging lenses 61A and 61C.

Figure 13:
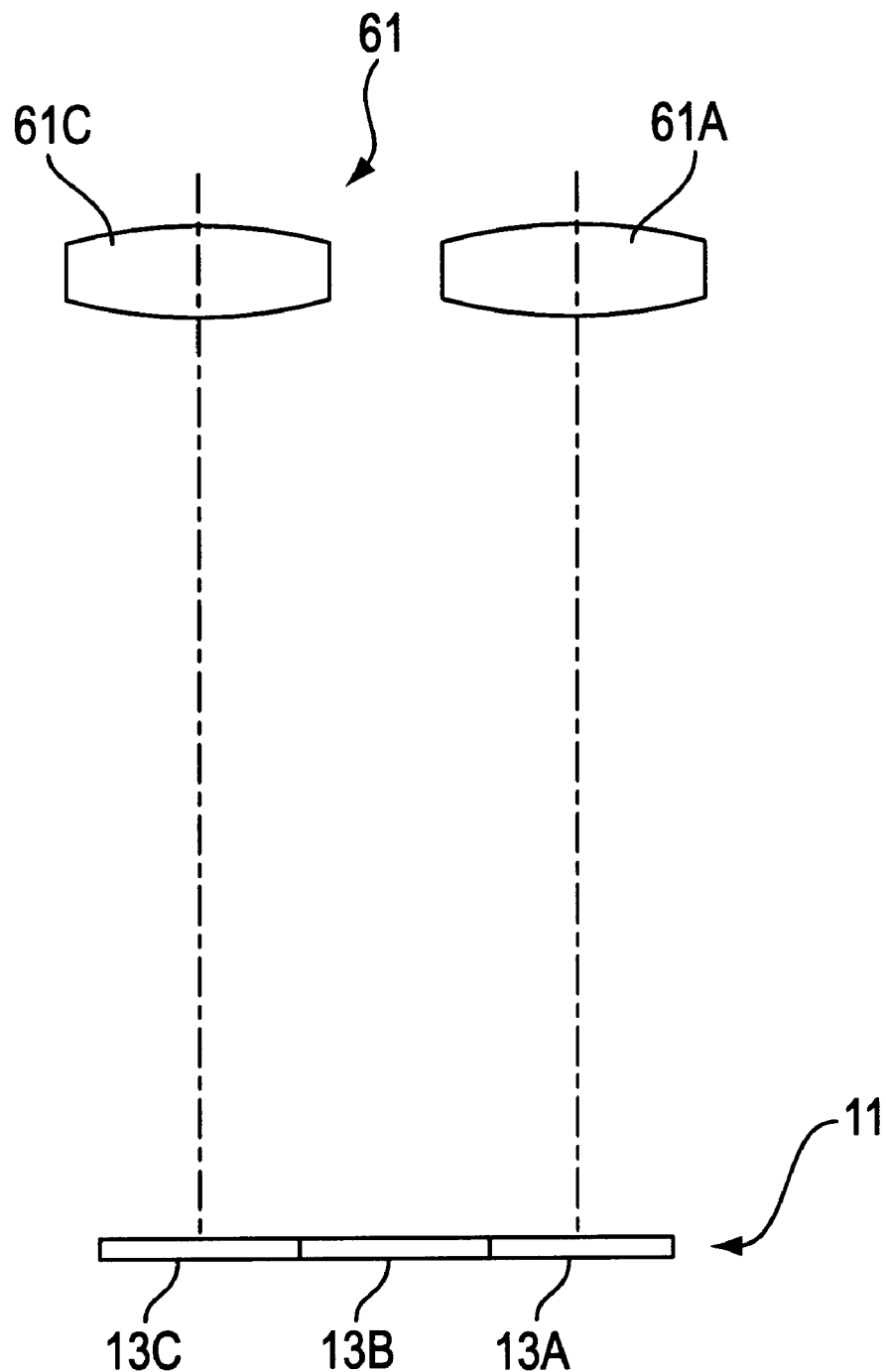

In the embodiment illustrated in FIG. 13, optical elements such as mirrors 54A1, 54A2, 54C1 and 54C2 are provided between the imaging lenses 61A, 61C and the line sensors 13A and 13C, respectively to deflect the object light passing through the imaging lenses 61A and 61B close to each other, as shown in FIG. 12. Thus, the distance between the imaging lenses 61A and 61B without changing the distance between the line sensors 13A and 13C to thereby increase the base length.

As can be seen from the foregoing, the AF sensor 11 makes it possible to measure the object distance in the three measuring areas spaced in the horizontal direction, when the AF sensor 11 is applied to a single lens reflex camera. When the AF sensor 11 is applied to a lens shutter type camera, since a pair of line sensors 13A and 13C which are spaced in the longitudinal direction of the line sensors used to conduct the triangulation measurement, the precision in the measurement of the object distance can be enhanced.

Figure 9A:
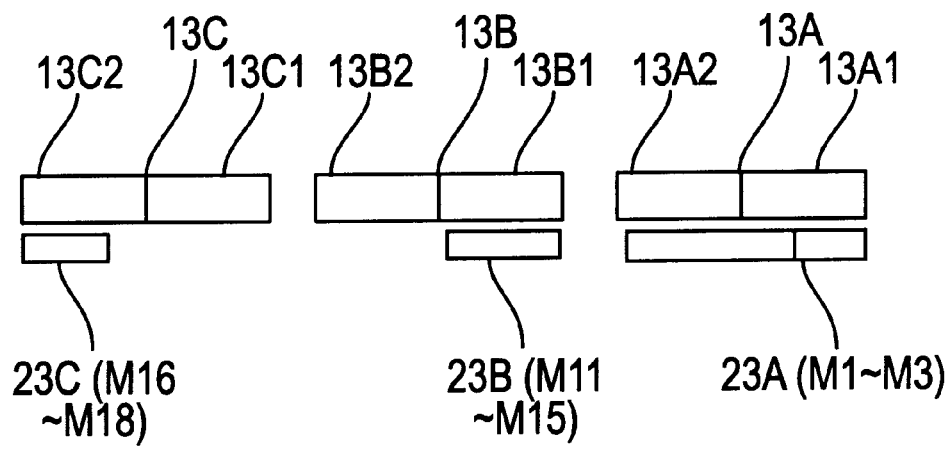
FIGS. 9A and 9B are schematic views of a light receiving element array of an AF sensor and a monitor sensor, for a single lens reflex camera and a lens shutter type camera, in a second embodiment, respectively.

The operation of the AF sensor 11 applied to a single lens reflex camera and a lens shutter type camera in a second embodiment will be described below, with reference to FIGS. 8, 9A and 9B. The optical arrangement is the same as that shown in FIGS. 12 and 13.

The line sensors to be used depend on the kind of the camera, i.e, LS or SLR in the second embodiment are shown in a table of FIG. 8. The line sensors and monitor sensors to be used for the single lens reflex camera and for the lens shutter type camera are indicated a thick solid lines in FIGS. 9A and 9B, respectively. For the single lens reflex camera (SLR), the integrating operation is carried out for all of the three line sensors 13A, 13B and 13C or those selected from among them. The integrating operation of the line sensor 13A is controlled by the light receiving elements M1 through M3 of the monitor sensor 23A; the integrating operation of the line sensor 13B is controlled by all of the five light receiving elements M11 through M15 of the monitor sensor 23B; and, the integrating operation of the line sensor 13C is controlled by all of the three light receiving elements M16 through M18 of the monitor sensor 23C. For the lens shutter type camera (LS), the integrating operation of the outer line sensors 13A and 13C are simultaneously performed. Note that the integrating operation control is accomplished using the monitor light receiving elements M1 through M10 of the monitor sensor 23A, which is adapted to monitor the line sensor 13A.

The operation of the second embodiment in which the AF sensor 11 is applied to a single lens reflex camera will be discussed below with reference to FIG. 9B and 13.

When the timing generator control circuit 31 receives the signal "1" (SLR) from the CPU 41 through the serial communication, the line sensors 13A, 13B and 13C perform the integral operation. Namely, the integrating operation (integration level) is controlled by the light receiving elements M1 through M3 of the monitor sensor 23A, the light receiving elements M11 through M15 of the monitor sensor 23B, the light receiving elements M16 through M18 of the monitor sensor 23C, and the integration control circuits 25A, 25B and 25C. The integrated charges of the photo diodes of the line sensors 13A, 13B and 13C are output to the CPU (controller) 41 as video signals. The CPU 41 calculates the distance between a pair of images for each of the line sensors 13A, 13B and 13C to thereby obtain a defocus amount.

The operation of the second embodiment in which the AF sensor 11 is applied to a lens shutter type camera will be discussed below with reference to FIG. 9B and 13.

Figure 9B:
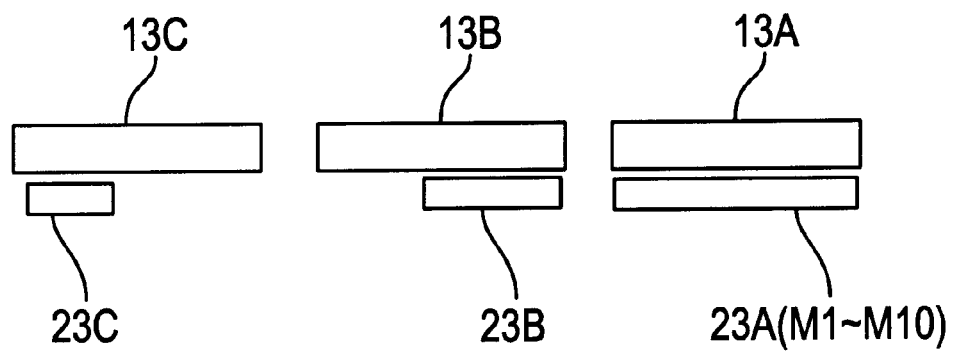

When the timing generator control circuit 31 receives the signal "0" (LS) from the CPU 41 through the serial communication, the line sensors 13A and 13C as indicated by the solid thick lines in FIG. 9B perform the integrating operation. Namely, the quantity of light received is monitored using the monitor light receiving elements M1 through M10 of the monitor sensor 23A and the integration control circuits 25A and 25B to control the integrating operation.

The integrated charges of the photo diodes of the line sensors 13A and 13C which have been simultaneously AGC-controlled by the monitor sensor 23A are output to the CPU 41 as video signals. The CPU 41 calculates the distance between the images on a pair of line sensors 13A and 13C in accordance with the video signals to thereby obtain the object distance based on the focal lengths of the imaging lenses 61A and 61C and the distance between the images, using triangulation.

As can be seen from the foregoing, the AF sensor 11 makes it possible to measure the object distance in the three measuring areas spaced in the horizontal direction, when the AF sensor 11 is applied to a single lens reflex camera. When the AF sensor 11 is applied to a lens shutter type camera, since a pair of line sensors 13A and 13C which are spaced farthest in the longitudinal direction of the line sensors are used to conduct the triangulation measurement, the precision in the measurement of the object distance can be increased.

Moreover, since the integrating time is controlled by the monitor sensors adjacent to the line sensors to be used, an appropriate quantity of light corresponding to the brightness of the object whose image is received by the line sensors can be obtained. In particular, since the line sensors are monitored by the monitor light receiving elements M1 through M3 of the monitor sensor 25A and by all of the monitor light receiving elements M1 through M10 of the monitor sensor 25A when the AF sensor 11 is applied to the single lens reflex camera and to a lens shutter type camera, respectively, optimum outputs of the line sensors can be obtained regardless of the focusing method.

Figure 11A:
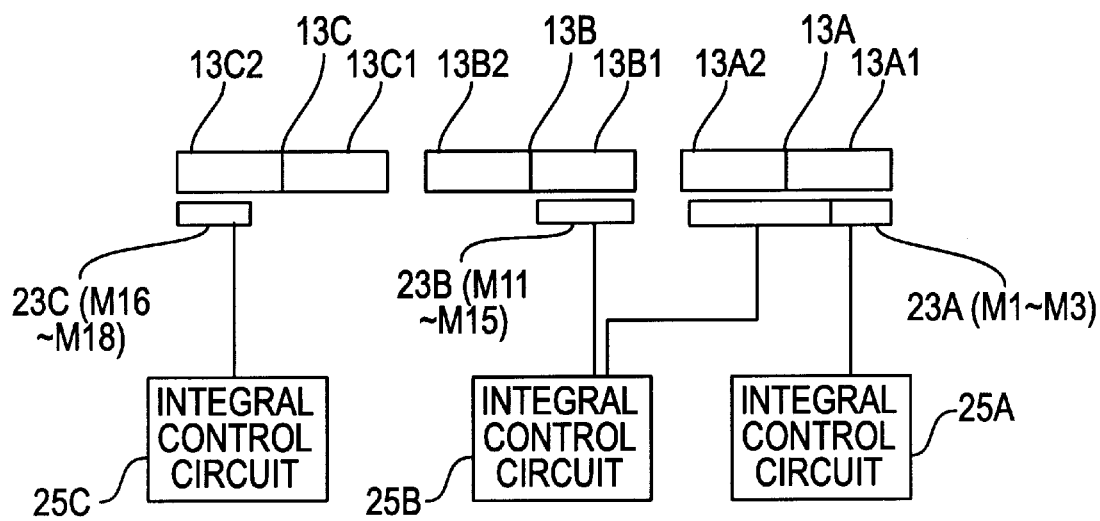
FIGS. 11A and 11B are schematic views of a light receiving element array of an AF sensor, a monitor sensor and an integration control circuit, for a single lens reflex camera and a lens shutter type camera, in a third embodiment, respectively.

The operation of the AF sensor 11 applied to a single lens reflex camera and a lens shutter type camera in a third embodiment will be described below, with reference to FIGS. 10, 11A and 11B. The optical arrangement is the same as that shown in FIGS. 12 and 13.

The line sensors to be used depend on the kind of camera, i.e, LS or SLR in the second embodiment are shown in a table of FIG. 10. The line sensors, the monitor sensors and the integration control circuits to be used for the single lens reflex camera and for the lens shutter type camera are indicated by thick solid lines in FIGS. 11A and 11B, respectively.

In this embodiment, when the AF sensor is applied to the single lens reflex camera, the integrating operation is carried out for all of the three line sensors 13A, 13B and 13C or for that or those selected from among them. The integrating operation of the line sensor 13A is controlled by the light receiving elements M1 through M3 of the monitor sensor 23A, the monitor dark sensor MD1, and the integration control circuit 25A; the integrating operation of the line sensor 13B is controlled by all of the five light receiving elements M11 through M15 of the monitor sensor 23B, the monitor dark sensor MD1, and the integration control circuit 25B; and, the integrating operation of the line sensor 13C is controlled by all the three light receiving elements M16 through M18 of the monitor sensor 23C, the monitor dark sensor MD2, and the integration control circuit 25C. For the lens shutter type camera (LS), the integrating operation of the outer line sensors 13A and 13C are simultaneously performed. Note that the integration control operation is accomplished using the monitor light receiving elements M1 through M10 of the monitor sensor 23A which is adapted to monitor the line sensor 13A, the monitor dark sensor MD1, and the integration control circuits 25A and 25B.

The operation of the third embodiment in which the AF sensor 11 is applied to a single lens reflex camera will be discussed below with reference to FIG. 11A and 13.

When the timing generator control circuit 31 receives the signal "1" (SLR) from the CPU 41 through the serial communication, the line sensors 13A, 13B and 13C perform the integrating operation. Namely, the integrating operation (integration level) is controlled by the monitor light receiving elements M1 through M3 of the monitor sensor 23A, the light receiving elements M11 through M15 of the monitor sensor 23B, the light receiving elements M16 through M18 of the monitor sensor 23C, and the integration control circuits 25A, 25B and 25C. The electric charges of the photo diodes of the line sensors 13A, 13B and 13C are output to the CPU (controller) 41 as video signals. The CPU 41 calculates the distance between a pair of images for each of the line sensors 13A, 13B and 13C to thereby obtain a defocus amount.

Although the openings 51A, 51B and 51C of the mask 51 which define the measuring area are aligned along a line in the illustrated embodiment, the arrangement of the openings is not limited thereto. For example, it is possible to arrange the openings in the shape of an "H", provided that the line sensors 13A, 13B and 13C are aligned along a line.

The arrangement in which the AF sensor 11 is applied to a lens shutter type camera in the third embodiment will be discussed below with reference to FIG. 11B and 13.

A pair of imaging lenses 61 (61A and 61C) as optical focusing elements are provided in front of the line sensors 13A and 13C. The beams incident upon the imaging lenses 61A and 61C are converged onto the line sensor 13A, the monitor sensor 23A and the line sensor 13C or in the vicinity thereof by the imaging lenses 61A and 61C to form object images.

Figure 11B:
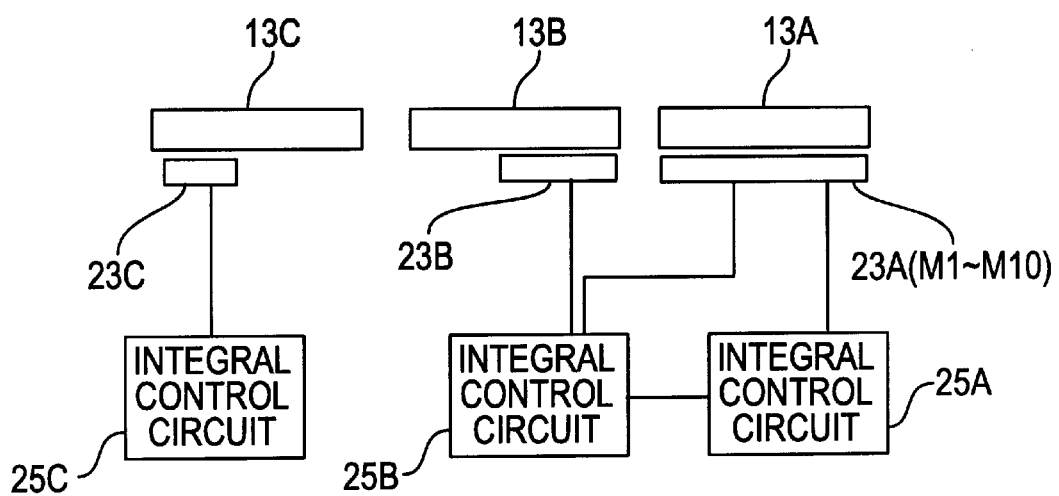

When the timing generator control circuit 31 receives the signal LS from the CPU 41 through serial communication, the line sensors 13A and 13C as indicated by the solid thick lines in FIG. 11B perform the integrating operation. Namely, the quantity of light received is monitored using all the monitor light receiving elements M1 through M10 of the monitor sensor 23A and the integration control circuits 25A and 25B to control the integrating operation.

The integrated charges of the line sensors 13A and 13C which have been simultaneously AGC-controlled by the monitor sensor 23A are output to the CPU 41 as video signals. The CPU 41 calculates the distance between the images on a pair of line sensors 13A and 13C in accordance with the video signals to thereby obtain the object distance based on the focal lengths of the imaging lenses 61A and 61C and the distance between the images, using triangulation.

As may be seen from the foregoing, in the AF sensors 11 according to the present invention, the monitor sensors 23A and 23C and the integration control circuits 25A and 25C can be commonly used to the independent integration control of the line sensors 13A, 13B and 13C and to the use of a pair of line sensors 13A and 13C. Moreover, the line sensors, the monitor sensors and the integration control circuits can be commonly used for a single lens reflex camera and a lens shutter type camera.

Furthermore, the AF sensor 11 makes it possible to measure the object distance in the three measuring areas spaced in the horizontal direction, when the AF sensor 11 is applied to a single lens reflex camera. When the AF sensor 11 is applied to a lens shutter type camera, since a pair of line sensors 13A and 13C which are spaced farthest in the longitudinal direction of the line sensors are used to conduct the triangulation measurement, the precision in the measurement of the object distance can be increased.

Moreover, since the integrating time is controlled by the monitor sensors adjacent to the line sensors to be used, an appropriate quantity of light corresponding to the brightness of the object whose image is received by the line sensors can be obtained. In particular, since the line sensor 13A is monitored by the monitor light receiving elements M1 through M3 of the monitor sensor 25A, and by all of the monitor light receiving elements M1 through M10 of the monitor sensor 25A when the AF sensor 11 is applied to the single lens reflex camera and to a lens shutter type camera, respectively, optimal quantity of light for the line sensor can be obtained regardless of the focusing method.

Although the three line sensors (light receiving devices) 13A, 13B, and 13C are used in the above-mentioned embodiments, the number of the line sensors is not limited thereto and can be more than three. Moreover, although all the line sensors are aligned along a line in the illustrated embodiments, it is not necessary to align all the line sensors along a line, so long as at least a pair of line sensors are aligned along a line.

Namely, the arrangement or direction of the line sensors other than at least a pair of line sensors which are to be aligned along a line is not limited to a specific one.

As may be understood from the above discussion, according to the first embodiment of the present invention, since the integration control means can control the integration of the light receiving device independently or can control a pair of light receiving devices simultaneously, it is possible to obtain not only the defocus amount of the object for each light receiving device, but also the object distance by the use of a pair of light receiving devices which are spaced farthest in the triangulation measurement. Namely, the focusing system of the present invention can be equally applied to a single lens reflex camera and a lens shutter type camera.

According to the second embodiment of the present invention, since the areas of the monitor light receiving device to be used which can monitor the substantially entire light receiving area of the light receiving device are switched in accordance with the independent integration control for each light receiving device or the simultaneous integration control of a pair of light receiving device, it is possible to obtain an appropriate quantity of light depending on the selected light receiving devices. Thus, an optimum quantity of light for each light receiving device can be obtained not only when the defocus amount of the object is detected for each light receiving device, but also when the object distance is detected in the triangulation measurement, using a pair of outermost light receiving devices. Consequently, the focus can be precisely detected in a wide brightness range. The precise detection of the focus is ensured if the object (or objects) has different brightnesses.

According to the third embodiment of the present invention, since the integration control means is commonly used for the independent integration control of each light receiving device and the simultaneous integration control of a pair of light receiving devices, the focusing system can be incorporated in a single lens reflex camera and in a lens shutter type camera. In addition to the foregoing, the number of the components can be reduced due to a common use of the integration control means.

What is claimed is:

1. A focusing system, comprising:
   a light receiving device having a pair of light receiving element arrays which receive object light; and
   determining means for determining whether output signals of said pair of light receiving element arrays are to be used for the detection of a defocus amount or the detection of an object distance.

2. The focusing system according to claim 1, wherein said light receiving device includes a central light receiving device and a pair of outer light receiving devices located on opposite sides of said central light receiving device, and which are spaced from one another by a predetermined distance.

3. The focusing system according to claim 2, wherein said determining means determines whether output signals of said central and said pair of outer light receiving devices are to be used for the detection of said defocus amount, or only output signals of said pair of outer light receiving devices are to be used for the detection of said object distance.

4. A focusing system in which object light is received by a plurality of light receiving devices, each having an array of light receiving elements, so that one of a defocus amount and an object distance can be detected in accordance with the output of said plurality of light receiving devices, comprising:
   said plurality of light receiving devices including a central light receiving device and a pair of outer light receiving devices located on opposite sides of said central light receiving device, and which are spaced from one another by a predetermined distance;
   control means for controlling the quantity of light received by each of said plurality of light receiving devices; and
   determining means which determines whether output signals of said central and said pair of outer light receiving devices, or only said pair of outer light receiving devices, are to be used for the detection of said one of a defocus amount and an object distance based upon a type of camera to which said focusing system is installed;

wherein each of said plurality of light receiving devices are independently controlled by said control means for detection of said defocus amount, and said pair of outer light receiving devices are controlled simultaneously by said control means for measuring object distance.

5. The focusing system according to claim 4, further comprising an optical focus detecting device to form a pair of spaced object images on at least one of said light receiving element arrays of said plurality of light receiving devices, so that an amount of said defocus can be detected in accordance with output signals of said at least one of said light receiving element arrays.

6. The focusing system according to claim 4, further comprising:
   a single lens reflex camera in which said focusing system is installed; and
   an optical focus detecting device which forms a pair of spaced object images on at least one of said light receiving element arrays of said plurality of light receiving devices through a photographing system, such that an amount of defocus can be detected in accordance with output signals of said at least one of said light receiving element arrays.

7. The focusing system according to claim 4, further comprising an optical focus detecting device having a pair of imaging lenses which forms an object image on said light receiving element arrays of said pair of outer light receiving devices, so that object distance can be detected based on output signals of said light receiving element arrays of said pair of outer light receiving elements.

8. The focusing system according to claim 4, further comprising:
   a lens shutter type camera in which said focusing system is installed; and
   an optical focus detecting device having a pair of imaging lenses which forms an object image on each of said light receiving element arrays of said pair of outer light receiving devices, such that an object distance can be detected in accordance with output signals of said light receiving element arrays of said pair of light receiving devices.

9. The focusing system according to claim 4, wherein said light receiving elements of said pair of outer light receiving devices are aligned along a line.

10. The focusing system according to claim 4, wherein said light receiving element arrays of said plurality of light receiving devices are aligned along a line.

11. The focusing system according to claim 4, further comprising a plurality of storage means, corresponding to each of said plurality of light receiving devices, for temporarily storing electric charges produced during integration by said control means, wherein electric charges are successively stored in each of said storage means when said plurality of light receiving devices are controlled independently, and electric charges produced are simultaneously stored in each of said plurality of storing means corresponding to said pair of outer light receiving devices when said pair of outer light receiving devices are controlled simultaneously.

12. An automatic focusing system in which object light is received and integrated by a plurality of light receiving devices, each having an array of light receiving elements, so that one of a defocus amount and an object distance can be detected in accordance with integrated values output by said plurality of light receiving devices, comprising:
   said plurality of light receiving devices including a central light receiving device and a pair of outer light receiving devices, located on opposite sides of said central light receiving device, and which are spaced from one another by a predetermined distance;
   a plurality of monitor means, corresponding to and adjacent each of said plurality of light receiving devices, for monitoring a quantity of light received by said plurality of light receiving devices;
   integration control means for controlling integration of each of said plurality of light receiving devices in accordance with output signals from said plurality of monitor means; and
   determining means which determines whether output signals from said central and said pair of outer light receiving devices, or only said pair of outer light receiving devices, are to be used for the detection of said one of a defocus amount and said object distance upon assembly of said focusing system to a camera;
   wherein at least one of said plurality of monitor means corresponding to said pair of outer light receiving devices can monitor substantially an entire light receiving area of a corresponding at least one of said pair of outer light receiving devices,
   wherein said integration control means controls one of said central and said pair of outer light receiving devices independently, and only said pair of outer light receiving devices simultaneously, in accordance with said determining means,
   and wherein said integration control means controls said at least one of said plurality of monitor means to monitor said substantially an entire light receiving area of said corresponding at least one of said pair of outer light receiving devices when said pair of outer light receiving devices are controlled simultaneously.

13. The automatic focusing system according to claim 12, wherein said integration control means controls said plurality of monitor means to monitor a portion of a light receiving area of said central and outer pair of light receiving device when said central and said pair of outer light receiving devices are controlled independently.

14. The automatic focusing system according to claim 13, wherein one of said plurality of monitoring means, adjacent to one of said pair of outer light receiving devices, has a width large enough to monitor substantially an entire light receiving area of said one of said pair of outer light receiving devices, and another of said plurality of monitoring means, adjacent to the other of said pair of outer light receiving devices, has a width large enough to monitor a portion of a light receiving area of said other of said pair of outer light receiving devices.

15. The automatic focusing system according to claim 13, wherein when integration is carried out only by said pair of outer light receiving devices, said at least one of said plurality of monitor means controls integration.

16. The automatic focusing system according to claim 13, further comprising an optical focus detecting device which forms a pair of spaced object images on at least one of said plurality of light receiving elements, so that when said defocus amount is detected in accordance with output signals of said at least one of said plurality of light receiving devices, said integration control means controls said quantity of light to be received by said at least one of said plurality of light receiving devices, using a light receiving area of each of said plurality of monitor means corresponding to said at least one of said plurality of light receiving devices.

17. The automatic focusing system according to claim 16, wherein said integration control means controls said integration using a portion of a light receiving area of those ones of said plurality of monitor means whose width is large enough to monitor substantially an entire light receiving area of a corresponding one of said plurality of light receiving devices.

18. The automatic focus system according to claim 12, further comprising an optical focus detecting device having a pair of imaging lenses to form an object image on each of said pair of outer light receiving devices, such that when said object distance is detected, said integration control means controls integration of said pair of outer light receiving devices, using an entire light receiving area of at least one of said plurality of monitor means which has a width large enough to monitor substantially an entire light receiving area of one of said pair of light receiving devices.

19. The automatic focusing system according to claim 12 wherein said light receiving elements of said pair of outer light receiving devices are aligned along a line.

20. The automatic focusing system according to claim 12, wherein said light receiving element arrays of said plurality of light receiving devices are aligned along a line.

21. An automatic focusing system in which object light is received and integrated by a plurality of light receiving devices, each having an array of light receiving elements, so that one of a defocus amount and an object distance can be detected based on an integrated value of said light receiving devices, comprising:

said plurality of light receiving devices including a central light receiving device and a pair of outer light receiving devices, located on opposite sides of said central light receiving device, and which are spaced from one another by a predetermined distance;

a plurality of monitor means, corresponding to and adjacent each of said plurality of light receiving devices, for monitoring a quantity of light received by said plurality of light receiving devices;

a plurality of integration control means for controlling an integration time for said plurality of light receiving devices in accordance with output signals from said plurality of monitor means, respectively; and determining means for determining whether output signals of said central and said pair of outer light receiving devices, or only said pair of outer light receiving devices, are to be used for the detection of said one of a defocus amount and an object distance upon assembly of said focusing system to a camera;

wherein each of said plurality of integration control means is used when outputs of said central and said pair of outer light receiving devices are to be used for the detection of said one of a defocus amount and an object distance in accordance with said determining means;

and wherein those of said plurality of integration control means corresponding to said central light receiving device and one of said pair of outer light receiving devices are used when said pair of outer light receiving devices are used for the detection of said one of a defocus amount and an object distance in accordance with said determining means.

22. The automatic focusing system according to claim 21, wherein at least one of said plurality of monitor means corresponding to said pair of outer light receiving devices can monitor substantially an entire light receiving area of a corresponding at least one of said pair of outer light receiving devices.

23. The automatic focusing system according to claim 22, wherein said integration time of one of said pair of outer light receiving devices is controlled by said integration control means for one of said pair of outer light receiving means using a part of said light receiving area, when said determining means determines that all light receiving means are to be used.

24. The automatic focusing system according to claim 21, wherein when said determining means determines that only said pair of outer pairs of light receiving means are to be used, said integration time of said pair of outer light receiving devices are controlled by those of said plurality of integration control means corresponding to one of said pair of outer light receiving means and said central light receiving device.

25. The automatic focusing system according to claim 21, further comprising an optical focus detecting device to form a pair of spaced object images on at least one of said plurality of light receiving devices through a photographing system, such that when said defocus is detected in accordance with output signals of said at least one of said plurality of light receiving devices, said integration control means controls said quantity of light to be received by said at least one of said plurality of light receiving devices, using at least one of said plurality of monitor means which corresponding to said at least one of said plurality of light receiving devices.

26. The automatic focus system according to claim 21, further comprising an optical focus detecting device having a pair of imaging lenses to form an object image on each of said pair of outer light receiving devices, such that when said object distance is detected, said integration control means controls integration of said pair of outer light receiving devices, using an entire light receiving area of at least one of said plurality of monitor means which has a width large enough to monitor substantially an entire light receiving area of one of said pair of light receiving devices.

27. The automatic focusing system according to claim 21, wherein said light receiving element arrays of said plurality of light receiving devices are aligned along a line.

28. The automatic focusing system according to claim 21, wherein said light receiving element arrays of said pair of outer light receiving devices are aligned along a line.

* * * * *